United States Patent
Eckel et al.

(10) Patent No.: US 10,150,500 B2
(45) Date of Patent: Dec. 11, 2018

(54) VIBRATION ABSORBER AND VIBRATION ABSORBER ASSEMBLY

(71) Applicant: Vibracoustic GmbH, Darmstadt (DE)

(72) Inventors: Hans-Gerd Eckel, Laudenbach (DE); Niklas Mueller, Freiburg (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 26 days.

(21) Appl. No.: 14/331,261

(22) Filed: Jul. 15, 2014

(65) Prior Publication Data
US 2015/0021129 A1  Jan. 22, 2015

(30) Foreign Application Priority Data
Jul. 19, 2013 (DE) .................. 10 2013 107 759

(51) Int. Cl.
F16F 15/03  (2006.01)
B62D 7/22  (2006.01)
F16F 7/10  (2006.01)

(52) U.S. Cl.
CPC ............ B62D 7/222 (2013.01); F16F 7/1011 (2013.01); F16F 15/03 (2013.01)

(58) Field of Classification Search
CPC . B62D 7/222; B60R 21/2037; B60R 21/2171; F16F 15/03; F16F 15/18; F16F 13/22; F16F 13/26; F16F 7/1011; F16F 2222/06; F16F 15/035; B60Q 5/003; F16C 32/0465; F16C 32/048
USPC .................................. 310/90.5, 51
See application file for complete search history.

(56) References Cited

U.S. PATENT DOCUMENTS

| | | | | |
|---|---|---|---|---|
| 4,444,444 A | * | 4/1984 | Benedetti | F16C 32/0442 310/90.5 |
| 4,851,731 A | * | 7/1989 | Saotome | G11B 19/20 310/156.32 |
| 4,918,345 A | * | 4/1990 | Vaillant de Guelis | F16C 32/0459 104/281 |
| 5,713,438 A | * | 2/1998 | Rossetti | F16F 7/1011 188/378 |

(Continued)

FOREIGN PATENT DOCUMENTS

CN  101251164 A  8/2008
CN  101324257 A  12/2008

(Continued)

OTHER PUBLICATIONS

Duerre et al (DE 102008030757), Translation.*

*Primary Examiner* — Bradley T King
*Assistant Examiner* — Stephen M Bowes
(74) *Attorney, Agent, or Firm* — Leydig, Voit & Mayer, Ltd.

(57) ABSTRACT

A vibration absorber comprising a supporting device, an oscillating mass, at least one coil device, and at least on permanent magnet device. The coil device includes at least one winding. A permanent magnet of the permanent magnet device generates a magnetic field extending through a yoke device of the permanent magnet device and through a part of the windings such that when current flows through the windings in a suitable manner, two forces are generated that act between the supporting device and the permanent magnet device and include an angle unequal to 0°.

16 Claims, 6 Drawing Sheets

(56) References Cited

U.S. PATENT DOCUMENTS

| | | | | |
|---|---|---|---|---|
| 5,820,113 | A * | 10/1998 | Laughlin | F16F 13/26 |
| | | | | 188/267 |
| 5,880,546 | A * | 3/1999 | Marroux | F16C 32/0465 |
| | | | | 310/187 |
| 5,957,440 | A * | 9/1999 | Jones | F16F 7/1005 |
| | | | | 244/54 |
| 9,013,588 | B2 * | 4/2015 | Moriya | G03B 3/10 |
| | | | | 348/208.99 |
| 2004/0124719 | A1 * | 7/2004 | Aoshima | H02K 1/145 |
| | | | | 310/49.04 |
| 2007/0241489 | A1 * | 10/2007 | Mizushima | F16F 15/03 |
| | | | | 267/140.14 |
| 2009/0266640 | A1 | 10/2009 | Oshima et al. | |
| 2013/0161921 | A1 * | 6/2013 | Cheng | B60G 11/14 |
| | | | | 280/124.179 |

FOREIGN PATENT DOCUMENTS

| | | |
|---|---|---|
| DE | 112006003088 T5 | 9/2008 |
| DE | 102008030757 A1 | 1/2010 |
| DE | 102011011823 A1 | 9/2012 |
| DE | 102011103817 A1 | 12/2012 |
| JP | 01291652 A * | 11/1989 |

\* cited by examiner

VIBRATION ABSORBER AND VIBRATION ABSORBER ASSEMBLY

CROSS-REFERENCE TO RELATED APPLICATIONS

Priority is claimed to German Patent Application No. DE 10 2013 107 759.5, filed on Jul. 19, 2013, the entire disclosure of which is hereby incorporated by reference herein.

FIELD

The invention relates to a vibration absorber, in particular a steering wheel vibration absorber, which has a supporting device, an oscillating mass, at least one coil device, each of which has at least one winding, and a permanent magnet device. Further, the invention relates to a vibration absorber assembly with such a vibration absorber.

BACKGROUND

Vibration absorbers are used, for example, in steering wheels of a motor vehicle in order to absorb vibrations which, stemming from the engine or the chassis, are transmitted onto the steering column. Such vibration absorbers are known from the prior art. For example, DE 10 2011 103 817 A1 describes an active vibration absorber designed for use on a steering wheel. DE 10 2011 011 823 A1 describes a method and device for the reduction, in particular absorption, of vibrations applied to a steering wheel of a motor vehicle.

SUMMARY

In an embodiment, the present invention provides a vibration absorber comprising a supporting device, an oscillating mass, at least one coil device, and at least on permanent magnet device. The coil device includes at least one winding. A permanent magnet of the permanent magnet device generates a magnetic field extending through a yoke device of the permanent magnet device and through a part of the windings such that when current flows through the windings in a suitable manner, two forces are generated that act between the supporting device and the permanent magnet device and include an angle unequal to 0°.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
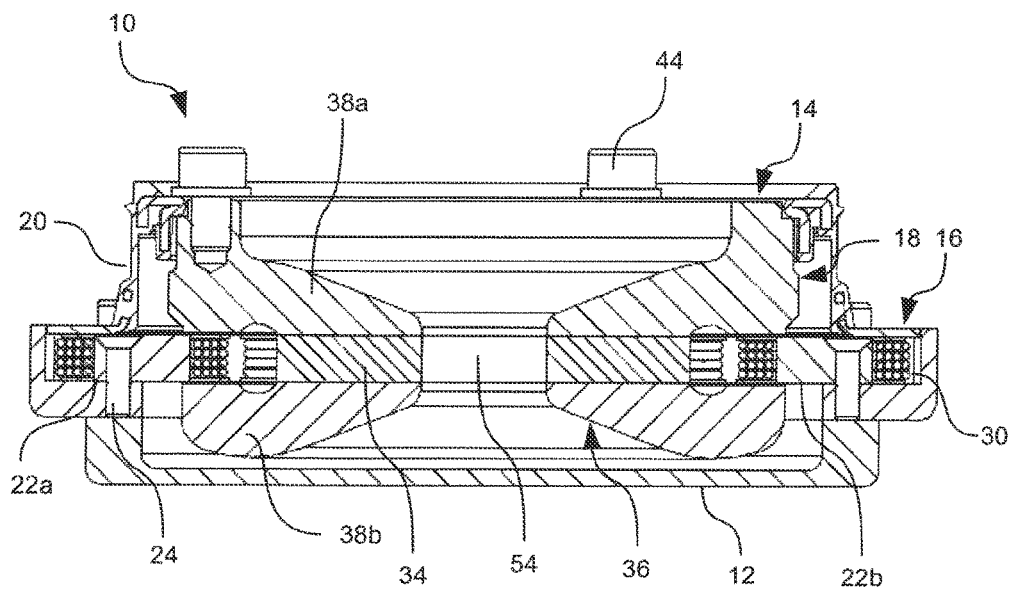
FIG. 1 shows a cross section through a vibration absorber according to the invention.

An aspect of the present invention is to provide a device that has an improved absorption effect. Even strong vibrations, in particular, are to be absorbable over a broad frequency band, as well as non-discrete vibrations.

The vibration absorber according to the invention, which is, in particular, a steering wheel vibration absorber, has a supporting device, an oscillating mass, at least one coil device, in particular at least two coil devices, each of which has at least one winding, and at least one permanent magnet device. A permanent magnet of the permanent magnet device generates a magnetic field extending through a yoke device of the permanent magnet device and through a part of the windings, so that, given a suitable current flow through the windings, two forces can be generated that act between the supporting device and the permanent magnet device and include an angle unequal to 0°.

Within the context of this invention, a vibration absorber is supposed to be understood to be a device that actively reduces vibrations to a large extent. In this case, the passive absorber is electrically driven in order to increase the efficiency of the passive absorber.

A steering wheel vibration absorber can be installed, for example, in the steering wheel of a motor vehicle, for example of a passenger car.

The permanent magnet device preferably has at least one permanent magnet and at least one yoke device of a ferromagnetic material. The coil device can be attached to one of the oscillating mass or the supporting device, while the permanent magnet device is attached to the respective other one of the oscillating mass and the supporting device.

The supporting device serves, in particular, for attaching the vibration absorber, for example to a steering wheel. The oscillating mass is preferably disposed in a movable manner relative to the supporting device and serves for damping or absorbing the oscillations or vibrations applied to the supporting device. This is done by the oscillating mass oscillating in the opposite direction of the vibration. A passive vibration absorption can be obtained by the oscillating mass being resiliently mounted relative to the supporting device, so that, given a suitable adjustment of inertia and spring rate, the disturbing vibration can be absorbed.

A current flow can be applied to the winding of the coil device, so that they are subjected to a force in the magnetic field.

The permanent magnet device can be configured in such a way that the coil device, in particular the two coil devices, can interact with a single permanent magnet device. Preferably, the at least two coil devices are disposed on different sides of the permanent magnet device. Alternatively, two permanent magnet devices can be used, which then respectively interact with the respective yoke device. The permanent magnet of the permanent magnet device generates a magnetic field that is guided through the yoke device assigned to the permanent magnet. Since the yoke device is made from a ferromagnetic material, such as, for example, iron, nickel and cobalt and alloys thereof, the field lines generated by the permanent magnet can be directed. The yoke device is disposed in such a way that the magnetic field generated by the permanent magnet runs through a part of the respective winding. In particular, this is supposed to mean that a coil device is assigned to a permanent magnet device. The unit consisting of the coil device and the permanent magnet device is disposed in such a way that the forces generated by the magnetic field and the current flow are orientated in such a way that they include an angle unequal to 0°, particularly in a single plane. The forces thus generated act, on the one hand, on the coil device and, on the other hand, on the permanent magnet device. The oscillating mass can thus be moved relative to the supporting device. The permanent magnet is preferably a disk or annular magnet.

The two generated forces are independent from each other, so that their superposition can generate forces in any direction of the coil plane. This is particularly simple if the components of the generated forces are perpendicular to each other. As a consequence, the oscillating mass can also be deflected in two directions that are perpendicular to each other. Thus, vibrations in the plane in which the oscillating mass is able to move can also be reduced. This can be used so that the steering wheel absorber is able to absorb the vibrations occurring in one direction in space independently from the angular position of the steering wheel. Thus, it is possible, for example, to absorb a vibration that, during the turning of the steering wheel relative to the steering column, vibrates in the same direction even while the steering wheel is being rotated and/or when the steering wheel has been turned. Due to the capability of the vibration absorber to deflect the oscillating mass in all directions of a plane, it offers the possibility of being used in various systems with different excitation directions.

This is advantageous particularly if the mode shapes of the steering wheel in the vertical and horizontal direction have different frequency positions and if both mode shapes are to be suppressed.

The above-described vibration absorber can do so at any angular position of the steering wheel.

Thus, the vibration absorber can also be used in other regions of a vehicle in order to absorb vibrations.

It is an advantage of this invention that the magnetic field generated by the permanent magnet can be guided through the windings by means of the yoke device, so that an interaction between the magnetic field and the current-carrying coil, the Lorentz force, occurs. This means that the current-carrying conductor is subjected to a force in the magnetic field.

Moreover, the vibration absorber can also be used for generating vibrations by controlling it with a control signal, for example to generate warning vibrations in a steering wheel as a tactile warning function. In particular, an eccentrically circulating movement of the oscillating mass, which corresponds to a rotating imbalance mass, can be generated by means of the vibration absorber.

Moreover, occurring vibrations can be reduced in all directions, because a total force that can point in all directions can be generated by superposing the generated forces.

If only one coil device with a single winding is used, a vibration absorber can be provided which enables a deflection of the oscillating mass in only one direction. Such a vibration absorber has a particularly simple structure and is particularly light.

It is preferred that the forces include an angle of 90°. This constitutes a preferred arrangement of two linearly independent forces. In a particularly simple manner, this makes it possible to generate a total force that can point in any direction. Moreover, non-discrete vibrations can be actively reduced in addition to discrete ones.

It is advantageous that the permanent magnet device is attached to the oscillating mass.

The permanent magnet device is usually heavier than the coil device owing to the permanent magnet and the yoke device. By disposing the permanent magnet device on the oscillating mass, the mass of the system comprised of oscillating mass and permanent magnet device can be increased in a simple manner, so that vibrations with greater amplitudes can be reduced.

Advantageously, the yoke device has two yoke halves, wherein the one ends of the two yoke halves preferably enclose the respective permanent magnet, and wherein also preferably the other ends of the two yoke halves enclose an air gap.

In particular, the yoke halves can have a substantially U-shaped cross section, wherein the ends of the yoke halves correspond to the free ends of the legs of the U-shaped yoke halves.

Due to this arrangement of the two yoke halves, the magnetic field generated by the permanent magnet can be returned from the one pole via the one yoke half and via the other yoke half to the other pole of the permanent magnet. This means that the magnetic field can be routed within the yoke device over almost its entire course, so that a particularly good guidance of the magnetic field is possible.

Advantageously, the yoke device is configured in the shape of a circle segment, in particular annularly, with the yoke device preferably having a curved portion close to the respective coil device.

In this case, the permanent magnet of the yoke device is preferably disposed on the side on which the center point of the circle segment-shaped yoke device is located. Accordingly, the ends of the yoke device that enclose the air gap between them are disposed on the side facing away from the center point. The circle segment-shaped yoke devices and thus, in particular, the circle segment-shaped permanent magnet device can constitute, for example, one fourth of a circular permanent magnet device. In particular, the circle segment-shaped yoke devices are arranged in such a way that they are placed close to the coil device.

In an annular yoke device, the permanent magnet is located inside, on the side facing towards the center point. In particular in the case of an annular yoke device, but also in the case of a circle segment-shaped yoke device, it is possible to use only one permanent magnet. In the case of an annular yoke device, only one permanent magnet device can be used, with the coil devices being disposed on different sides of the yoke device. In the case of circle segment-shaped yoke devices, several permanent magnet devices can be used, wherein each can be assigned one coil device.

The yoke device has a curved portion, in particular a circular curved portion, close to the respective coil device. This is advantageous in that the permanent magnet device has a circular circumference, which is particularly suitable for installation in a steering wheel.

Advantageously, the coil device has one coil body, respectively, on which one winding is wound, with the coil device preferably having two coil bodies, respectively, which are disposed opposite from one another.

The element on which the windings are wound is supposed to be understood to be the coil body. Accordingly, in the embodiment of the coil device with two coil bodies, there are two windings per coil device, which are, in particular, opposite from one another. In this case, at least two coil devices, in particular, are provided. Accordingly, there is a total of four windings, with two windings, respectively, being opposite from one another. In particular, the windings are spaced by 90° in the circumferential direction.

In an advantageous embodiment, a permanent magnet device is located at each winding, so that four windings and four permanent magnet devices are provided. Alternatively, the four permanent magnet devices can be formed by a single annular permanent magnet device.

Preferably, the coil body has a central region and two projections projecting from the central region, with the central region and the projections preferably forming a space in which the winding is disposed.

The projections can be considered to be the legs of a U, while the central region has the connection of the two legs of a U. Accordingly, a cross section of the coil body is preferably U-shaped on one side. The winding is in that case wound on the central region between the two legs.

Advantageously, the coil body can have a first side disposed in the air gap, wherein the first side is preferably straight.

In this case, the coil body can be configured to be elongated, with one of the longer sides, in particular, being the first side. Preferably, the first side is disposed in the gap in such a way that the magnetic field leaving the yoke device runs directly through the winding located at the first side.

It was found that, if the yoke device has the curved portion, a straight configuration of the first side generates a particularly strong force. This is due to the fact that the other longer side of the coil body is farther from the first side than is the case for an arcuate contour of the first side (parallel to the other side), so that the forces generated by the other side of the coil body are smaller (as a consequence of the magnetic stray filed) and counteract the forces of the first side less strongly. The side of the coil body facing away from the first side is preferably configured to be convex.

Advantageously, the projections on the first side each have at least one hole, with the projections and/or the central region preferably being made from a material which does not influence the magnetic field and which is electrically insulating. If the material is electrically non-conductive, eddy currents occurring there can be avoided. For example, the material has a magnetic permeability close to 1.

The projections of a magnetically non-conductive/non-ferromagnetic material preferably have no influence on the field line pattern of a magnetic field.

Advantageously, two gaps are disposed between the coil body and the ends of the yoke halves.

In a magnetic circuit, the distance of the magnetic poles, in this case magnetic flux-guiding yokes, is usually referred to as an air gap. The distances of the coils/coil carriers from the yokes are part of the air gap. Preferably, they are functionally relevant clearances.

The two gaps can advantageously be disposed between the two yoke halves and the projections. Advantageously, the gap between the projection and the corresponding yoke half is less than 2 mm, preferably in the range of 0.1 to 0.3 mm.

Advantageously, the coil bodies, particularly the projections, are configured as plain bearing surfaces for the yoke device, particularly for the ends of the yoke halves. Advantageously, the oscillating mass is accordingly supported with the permanent magnet device on the coil body as a plain bearing. The bearing is put to use particularly when the oscillating mass is deflected perpendicularly to the forces. In addition, the oscillating mass is supported in the axial direction by the inserted (elastomer) resilient bodies, so that, given a suitable adjustment, a contact between the oscillating mass and the coil body occurs only in the case of large deflections, perpendicular to the forces of the permanent magnet device.

In an advantageous development, the central region and/or the projection are made from a friction-reducing material, in particular from POM or PTFE, or are coated with PTFE.

If such materials are used for the projection on the first side, particularly for the entire coil body, which is made from such a material which is friction-reducing, the friction between the projection and the yoke device can be reduced to a particularly large extent.

Advantageously, the winding is made from an enamel-insulated copper wire. The cross section of the copper wire can be made circular or rectangular (with rounded edges). A particularly high packing density and thus power density can be achieved using thin copper band as a winding.

They constitute particularly simple and thus cost-effectively produced variations of a winding.

Advantageously, the oscillating mass comprises an attachment means for attaching an additional oscillating mass, in particular one and/or more holes for screws.

A gas generator for an airbag and/or the airbag itself can be used as the additional oscillating mass. Advantageously, the vibration absorber can comprise a resilient body of an elastic material, by means of which the oscillating mass is resiliently mounted on the supporting device. The resilient body supports the oscillating mass with the permanent device relative to the supporting device. Due to the resilient body, the oscillating mass is able to move relative to the supporting device. In the case of pronounced movements of the oscillating mass, particularly in the case of movements out of the plane of the coil bodies, the projections and the yoke devices serve as plain bearing surfaces. In the state of no current being applied to the windings, the vibration absorber acts as a passive vibration absorber or seismic damper, depending on the selected tuning frequency.

Advantageously, the mass of the oscillating mass and/or the additional oscillating mass, in conjunction with the elasticity of the resilient body, has a natural frequency connected with the frequency with the largest amplitude of the vibration of the supporting device. For example, given a customary frequency response of an absorber, the natural frequency is 80% to 94%, in particular 85%, of the frequency to be suppressed.

The mass of the permanent magnet device is also included in the oscillating mass. If the supporting device is attached to steering wheel of a vehicle, there usually is a frequency of the vibration whose amplitude is particularly large. Through the mass of the oscillating mass and/or the additional oscillating mass and the elasticity of the resilient body, the natural frequency can be adjusted in such a way that the frequency with the largest amplitude of the vibration can be passively reduced.

The invention moreover provides a vibration absorber assembly comprising a vibration absorber according to the invention, a sensor device and a control device. The sensor device is suitable for detecting vibrations in the working plane with respect to the amplitudes, the frequencies and the directions. The control device is suitable for controlling the vibration absorber in such a way that the above-mentioned vibrations are reduced to a great extent.

For this purpose, a regulating algorithm is processed in the control device. For example, a regulation in the closed circuit into minima has to be carried out in parallel in two directions that depend on the steering angle.

The operation mode "Warning" can also be stored in the control device.

In particular, the sensor device detects the frequencies of the vibrations transmitted onto the vibration absorber assembly, for example through the steering column. In addition, the sensor device also detects the directions of the vibrations, and thus also the current steering angle. The sensor device and the control device can be integrated into the supporting device, so that the vibration absorber assembly constitutes an autonomous system.

The vibrations and the vibration amplitudes are transmitted to the control device, which regulates the current flow in the individual windings.

The invention is explained in more detail below with reference to exemplary embodiments that are schematically shown in the Figures.

Figure 4A:
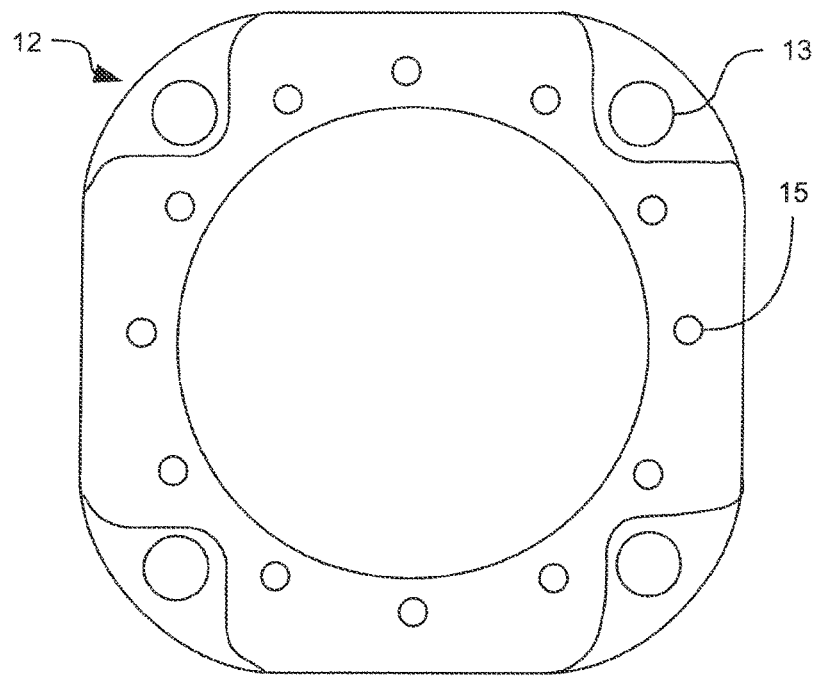
FIG. 4*a* shows a supporting device of the vibration absorber.

FIG. 1 shows a vibration absorber 10 with a supporting device 12, an oscillating mass 14, two coil devices 16 consisting of two pairs of coil bodies 22, and a permanent magnet device 18. As can be seen in FIG. 4a, the supporting device 12 has attachment holes 13 by means of which the supporting device 12 can be attached to, for example, a steering wheel. As can also be seen in FIG. 4a, the supporting device 12 further comprises coil holes 15 with a thread by means of which a coil body 22 can be attached using coil screws 24.

The oscillating mass 14 is connected to the supporting device 12 via a resilient body 20. The resilient body 20 consists of an elastic material, so that the oscillating mass 14 may oscillate relative to the supporting device 12. The oscillating mass 14 has a central bore 54 through which cables or plugs, for example, can be routed. The latter can be connected to an airbag that can be attached to the oscillating mass 14 as an additional oscillating mass, for example by means of screws 44 that are screwed into holes of the oscillating mass 14.

Figure 4B:
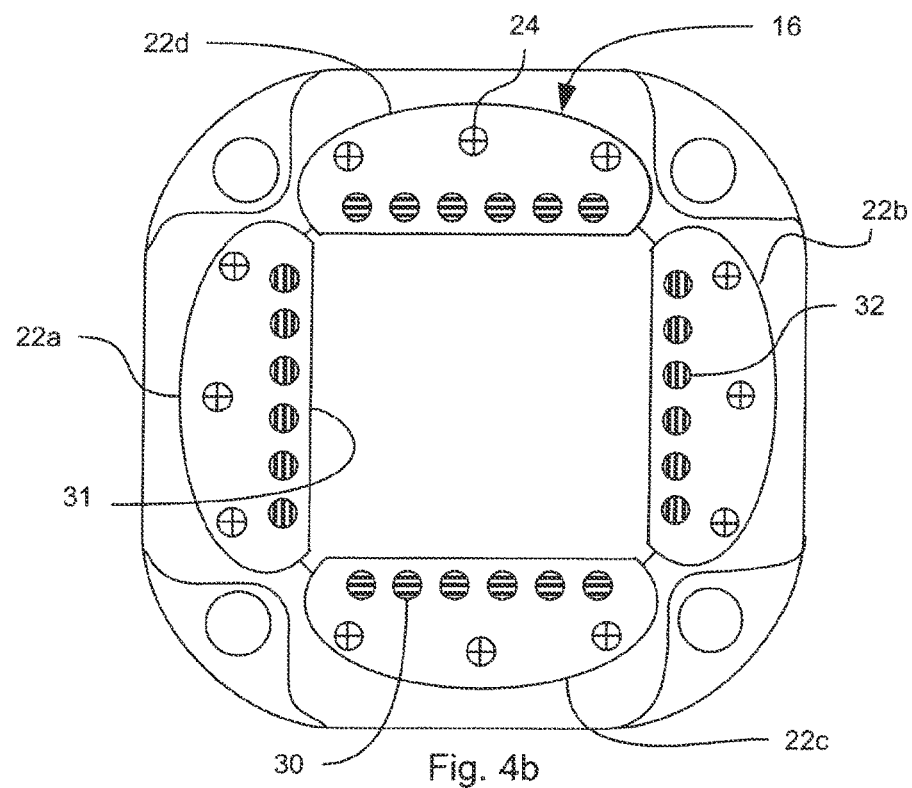
FIG. 4*b* shows the supporting device with coil devices attached thereto.

As shown in FIG. 4b, each coil device 16 comprises two coil bodies 22a, 22b and, offset by 90°, two coil bodies 22c and 22d, which are respectively disposed opposite. The coil bodies 22 are attached to the supporting device 12 by means of the coil screws 24.

Figure 3:
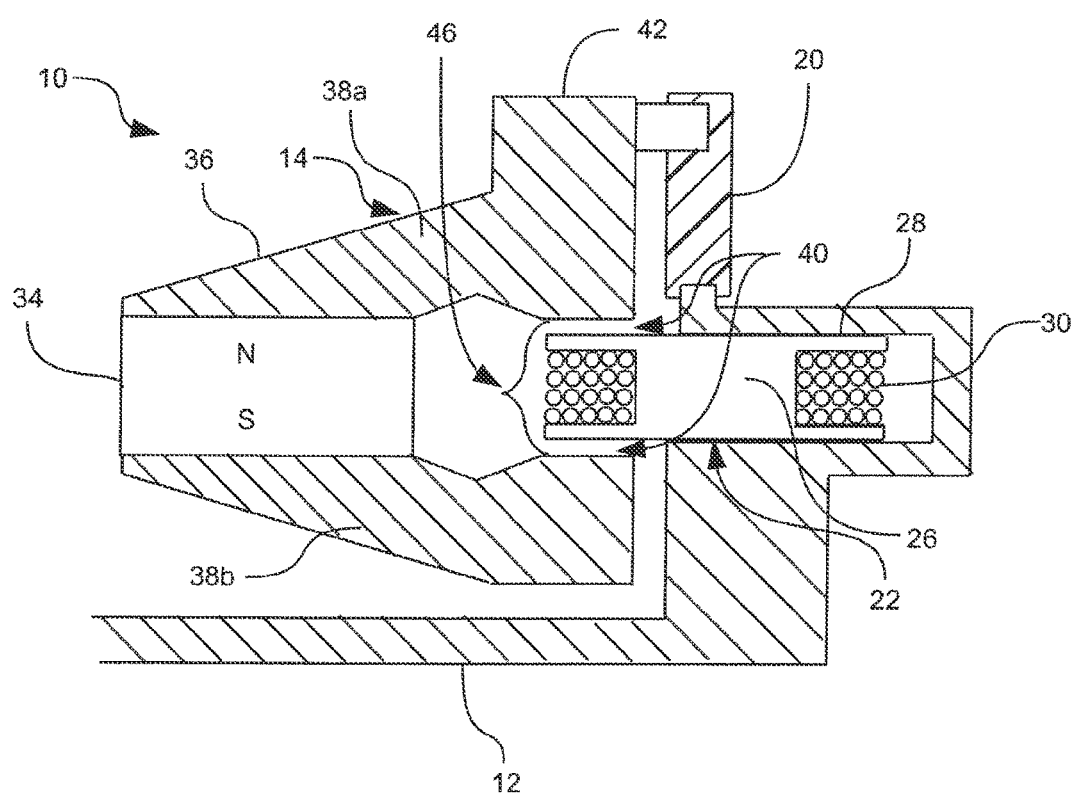
FIG. 3 shows an enlarged partial cross section of the vibration absorber.
Figure 5A:
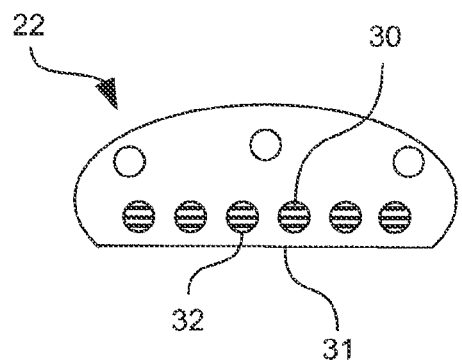
FIG. 5*a* shows a top view of a coil device.
Figure 5B:
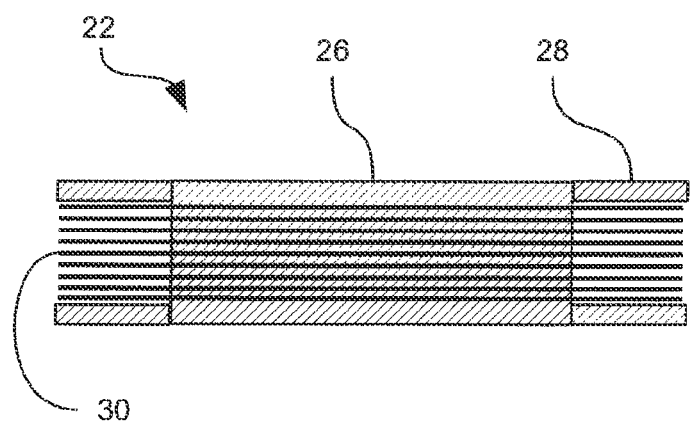
FIG. 5*b* shows a side view of the coil device.

As is shown in FIGS. 3 and 5b, for example, the coil body 22 has a central region 26 and projections 28 projecting from the central region 26. A winding 30 is disposed in the space between the two projections 28. The winding 30 is wound around the central region 26.

The coil bodies 22 are configured in an elongated manner. On the first side 31, on which the coil body 22 faces towards the permanent magnet device 18, the projections 28 have holes 32. The central region 26 and the projections 28 are made from POM or PTFE. The end faces of the coil bodies 22 can also be PTFE-coated.

As shown in FIG. 3, the permanent magnet device 18 has a permanent magnet 34 whose north pole N is disposed at the top in FIG. 3, while the south pole S is disposed towards the bottom. The permanent magnet device 18 furthermore comprises a yoke device 36 formed from two yoke halves 38a, 38b. The one ends of the yoke halves 38a, 38b are in contact with the permanent magnet 34, whereas the other ends of the yoke halves 38a, 38b are opposite from one another and form an air gap 46 therein. The coil body 22, particularly the first side 31 thereof, is located in the air gap 46.

On the side of the air gap 46, the yoke halves 38a, 38b have a curved portion, which in the embodiment shown is circular. The yoke half 38a, which in FIG. 3 is shown at the top, has an extension 42 that serves as an attachment means for attaching an additional mass. For this purpose, the extension 42 comprises, for example, threaded holes for screws 44 that can be used for attaching the additional mass. It may be remarked at this point that the higher the absorber mass, the higher, as a rule, the absorbing effect that can be achieved.

The magnetic field generated by the permanent magnet 34 flows via one yoke half 38a into the air gap 46, i.e. through the coil body 22, in particular through the holes 32 of the projections 28, and the winding 30, and back to the permanent magnet 34 via the other yoke half 38b. A gap 40 smaller than 2 mm is located between the yoke halves 38 and the projections 28 at the top and at the bottom, respectively. The projections 28 serve as plain bearing surfaces for the yoke halves 38a, 38b.

The relative movement of the oscillating mass 14 relative to the supporting device 12 takes place in a plane defined by the end faces of the coil bodies 22 or of the projections 28, as this is also apparent from FIG. 1 or FIG. 4b.

Figure 6A:
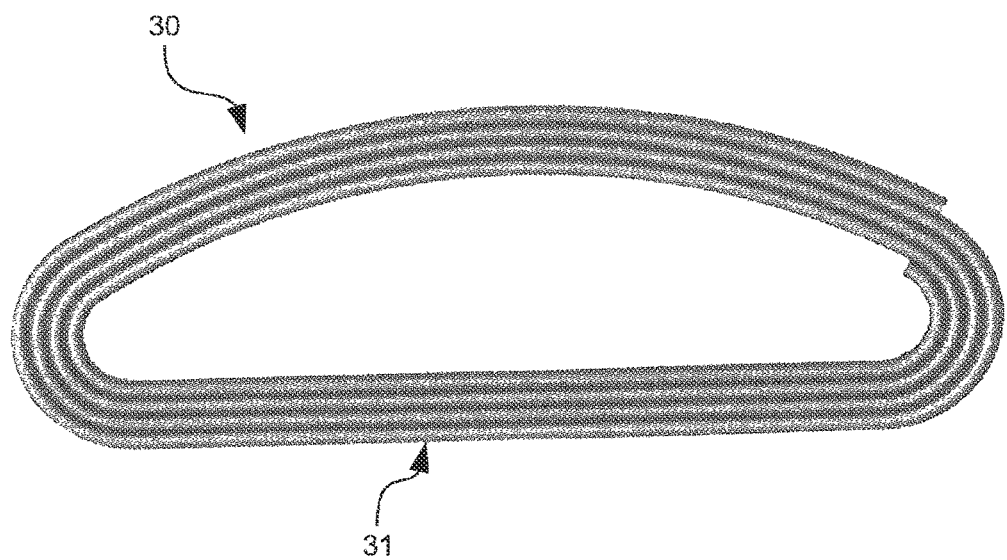
FIG. 6*a* shows a view of a winding in a first embodiment.
Figure 6B:
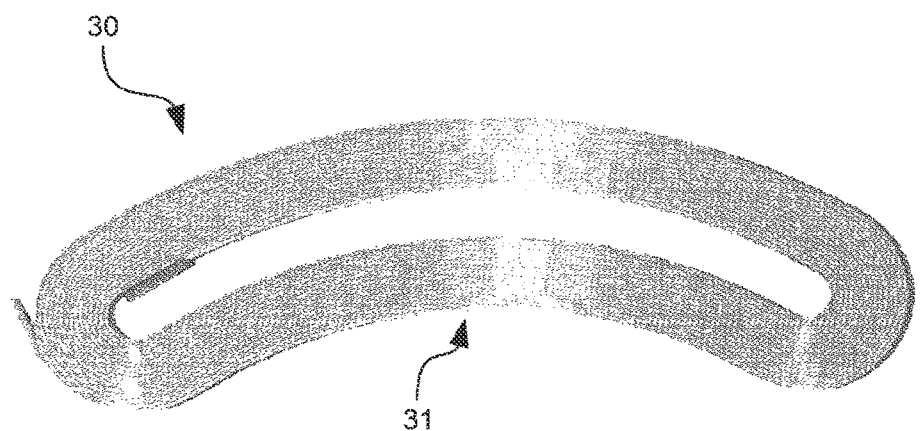
FIG. 6*b* shows a winding in a second embodiment.

FIGS. 6a and 6b show different windings of the coil body 22 of the coil device 16. As shown in FIG. 6a, the winding 30 can consist of a relatively thick wire with a rectangular cross section and rounded edges, with the beginning and the end of the coil wire not being shown. In another embodiment shown in FIG. 6b, the winding is formed 30 from a thin metal band.

In FIG. 6a, the first side 31 is shown to be straight, in FIG. 6b, the first side 31 is shown to be curved.

Figure 7A:
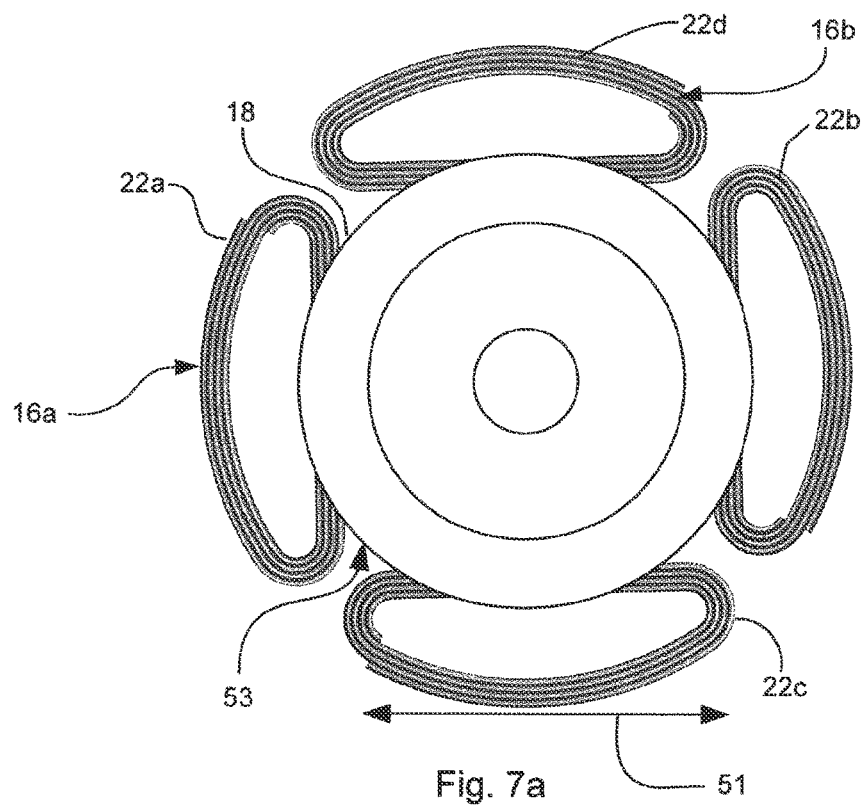
FIG. 7*a* shows the windings and a supporting device, with current being applied to the lateral windings.

FIGS. 7a and b show the arrangements of the coil devices 16a with the coil bodies 22a and 22b and of the coil device 16b with the coil bodies 22c and 22d. The coil devices 16a and 16b are disposed offset by 90°. The coil devices 16a and 16b are disposed on the outer circumference of the supporting device 12.

Figure 7B:
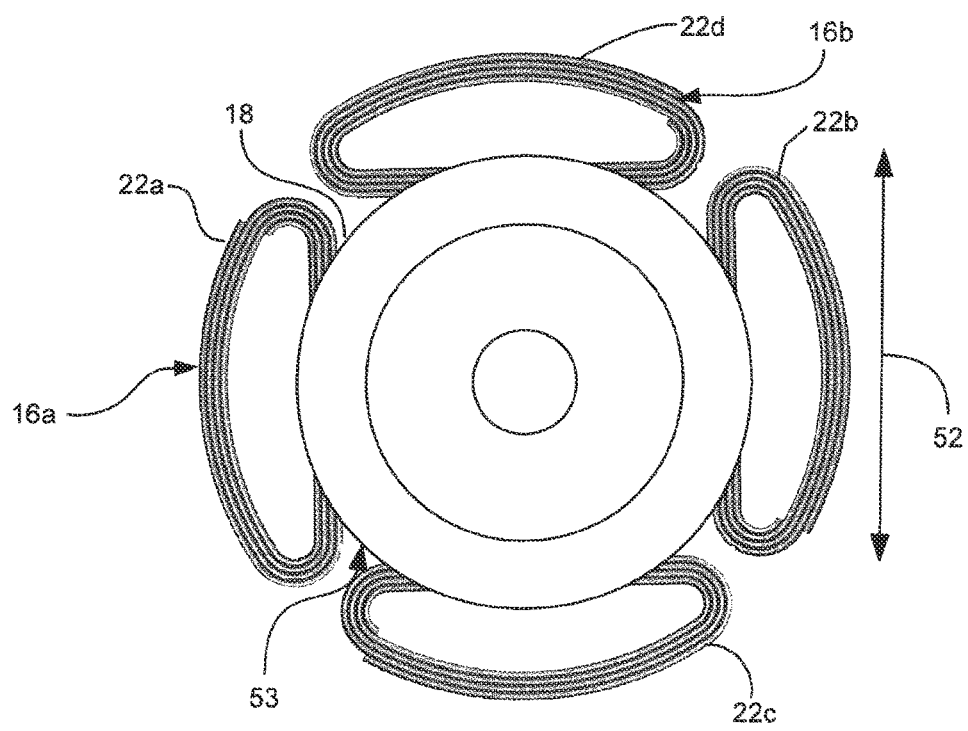
FIG. 7*b* shows the windings and a supporting device, with current being applied to the upper and lower windings.

Assuming that the magnetic field generated by the permanent magnet extends across the air gap 46 (region of the ring surface 53 shown) from a north pole located at the top to a south pole located and the bottom, and that current flows through the coils of the coil bodies 22a and 22b in opposite directions of rotation (for example, coil body 22a clockwise and coil body 22b counter-clockwise), then forces acting on the supporting device 12 in the direction of the double arrow 51 can be generated. The same activation of the coils of the coil bodies 22c and 22d of the coil device 16 results in a direction of action in accordance with the double arrow 52, as shown in FIG. 7b.

Figure 2:
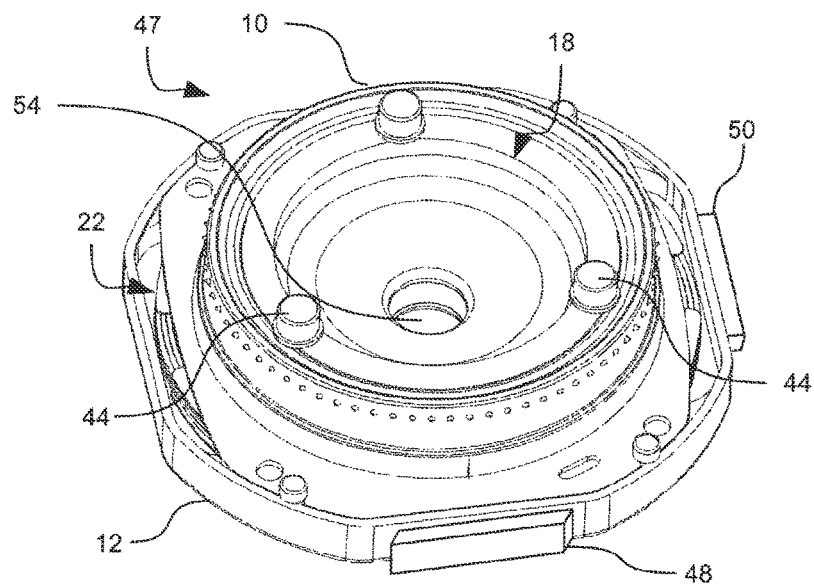
FIG. 2 shows a perspective view of a vibration absorber assembly according to the invention.

FIG. 2 shows a perspective view of a vibration absorber assembly 47. The vibration absorber assembly 47 comprises a vibration absorber 10, a sensor device 48 and a control device 50. The sensor device 48 serves for measuring vibrations occurring at the supporting device 12. In particular, it measures the frequency of the vibration and the direction of the vibration occurring. The control device 50 is electrically connected to the windings 30. The control device 50 controls the current flow through the winding 30.

The basic mode of operation of the vibration absorber assembly 47 will be described below.

The sensor device 48 detects the frequency and the direction of the vibrations occurring at the supporting device 12, which are transmitted, for example, by the steering column. Depending on these measured values, the control device 50 controls the current through the windings 30 of the coil devices 16a and 16b. A current, which interacts on the first side 31 with the magnetic field conducted from the permanent magnet 34 via the yoke halves 38a and 38b to the winding 30 on the first side 31, and which generates a Lorentz force, now flows through the windings 30.

In the process, the force acts in a plane spanned by the coil bodies 22 of the coil devices 16a, 16b. The respective two coil bodies 22 that are opposite from one another generate a force in the connecting direction of the two coil bodies 22 that are opposite from one another. A force in any direction in the plane can be generated by superposition by means of the two pairs of opposite coil bodies 22a, 22b and 22c, 22d, respectively. Current flows through the windings 30 in the two opposite coil bodies 22 that the generated force acting on the oscillating mass 12 points in the same direction.

By varying the current flow in the two pairs of windings 30 of opposite coil bodies 22, the total force resulting therefrom can be generated in any direction and different strength. Accordingly, a force is generated that counteracts the vibration as regards strength and direction.

This makes it possible to absorb vibrations applied to the steering wheel in all rotary positions of the steering wheel.

Particularly high forces that are able to move even a heavy oscillating mass 14 can be generated by the arrangement and configuration of the permanent magnet device 18 and the coil device 16 (the heavy permanent magnet device 18 is attached to the oscillating mass 14). Therefore, even vibrations with high amplitudes can be absorbed.

Due to the natural frequency of the oscillating mass 14, which results from its mass and the elasticity of the resilient body 20, a vibration frequency can be passively absorbed, i.e. without activating the windings 30, because of the inertia of the oscillating mass 12. A wide-band reduction of the vibrations remains reserved for active absorption.

The vibration absorber assembly 47 exhibits an active absorption due the interaction between the magnet and the coils and a passive absorption due to the resilient body vibration measuring system. Moreover, the vibration absorber 10 can be used for providing a tactile warning function on the steering wheel. Accordingly, three functions are being realized in a single system.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST

10 Vibration Absorber
12 Supporting device
13 Attachment hole
14 Oscillating mass
15 Coil hole
16, 16a, 16b Coil device
18 Permanent magnet device
20 Resilient body
22a, 22b, 22c, 22d Coil body
24 Coil screw
26 Central region
28 Projection
30 Winding
31 First side
32 Hole
34 Permanent magnet
36 Yoke device
38a Yoke half
38b Yoke half
40 Gap
42 Extension
44 Screw
46 Air gap
47 Vibration absorber assembly
48 Sensor device
50 Control device
51 Double arrow
52 Double arrow
53 Ring surface
54 Central bore

The invention claimed is:

1. A vibration absorber comprising:

a supporting device;

an oscillating mass resiliently attached to the supporting device;

a first coil device directly attached to the supporting device at an outer circumference thereof, the first coil device including a first coil body defining a first axis and a first winding wound around the first coil body in a winding plane perpendicular to the first axis;

a second coil device directly attached to the supporting device at an outer circumference thereof, the second coil device including a second coil body defining a second axis spaced apart from the first axis and perpendicular to the winding plane, the second coil device including a second winding wound around the second coil body in the winding plane; and a permanent magnet device having a single permanent magnet connected to the oscillating mass, wherein the permanent magnet of the permanent magnet device generates a magnetic field, wherein the oscillating mass, which is configured to hold the permanent magnet device in the winding plane and interior to the first coil device and the second coil device such that the magnet field generated by the permanent magnet is guided by the oscillating mass through a part of the windings such that when current flows through the windings, two magnetic forces are simultaneously generated at an angle unequal to 0° relative to each other in the winding plane that act between the supporting device and the permanent magnet device, wherein the oscillating mass has two yoke halves, wherein first ends of the two yoke halves enclose the respective permanent magnet and wherein second ends of the two yoke halves enclose an air gap.

2. The vibration absorber according to claim 1, wherein the forces act at an angle of 90°.

3. The vibration absorber according to claim 1, wherein the permanent magnet device is attached to the oscillating mass.

4. The vibration absorber according to claim 1, wherein the oscillating mass comprises an attachment mechanism for attaching an additional oscillating mass.

5. The vibration absorber according claim 1, wherein the oscillating mass is resiliently mounted on the supporting device via a resilient body of an elastic material.

6. A vibration absorber assembly comprising: a vibration absorber according to claim 1, with a sensor device that is suitable for detecting vibrations and their vibration direction, and with a control device that is suitable for controlling a current flow through the windings, with the control device controlling the current flow through the windings in such a way that the total force resulting from the two forces opposes the vibration direction.

7. The vibration absorber according to claim 1, wherein the vibration absorber is a steering wheel vibration absorber.

8. The vibration absorber according to claim 1, wherein the oscillating mass is configured in the shape of a circle segment with a curved portion close to each respective coil device.

9. The vibration absorber according to claim 8, wherein the oscillating mass is configured annularly.

10. The vibration absorber according to claim 1, wherein the first and second coil devices each have two coil bodies, the two coil bodies of the first coil device disposed opposite from one another and the two coil bodies of the second coil device disposed opposite from one another.

11. The vibration absorber according to claim 10, wherein each coil body has a central region and two projections projecting from the central region, with the central region and the projections forming a space in which the winding is disposed.

12. The vibration absorber according to claim 10, wherein each coil body has a first side disposed in the air gap, wherein the first side is straight.

13. The vibration absorber according to claim 12, wherein two gaps are formed between each coil body and the ends of the yoke halves.

14. The vibration absorber according to claim 13, wherein each coil body has a central region and two projections projecting from the central region, and wherein at least one of the central region or the projection is made from a friction reducing material.

15. The vibration absorber according to claim 14, wherein the friction reducing material is at least one of POM or PTFE.

16. A vibration absorber assembly comprising:
a vibration absorber comprising:
a supporting device;
an oscillating mass resiliently attached to the supporting device;
a first coil device directly attached to the supporting device at an outer circumference thereof, the first coil device including a first coil body defining a first axis and a first winding wound around the first coil body in a winding plane perpendicular to the first axis;
a second coil device directly attached to the supporting device at an outer circumference thereof, the second coil device including a second coil body defining a second axis spaced apart from the first axis and perpendicular to the winding plane, the second coil device including a second winding wound around the second coil body in the winding plane;
a permanent magnet device having a single permanent magnet connected to the oscillating mass, wherein the permanent magnet of the permanent magnet device generates a magnetic field, wherein the oscillating mass, which is configured to hold the permanent magnet device in the winding plane and interior to the first coil device and the second coil device such that the magnet field generated by the permanent magnet is guided by the oscillating mass through a part of the windings such that when current flows through the windings, two magnetic forces are simultaneously generated at an angle unequal to 0° relative to each other and in the winding plane that act between the supporting device and the permanent magnet device, wherein the oscillating mass has two yoke halves, wherein first ends of the two yoke halves enclose the respective permanent magnet and wherein second ends of the two yoke halves enclose an air gap;
a sensor device that is configured to detect vibrations and their vibration direction; and
a control device that is configured to control a current flow through the windings, wherein the control device controls the current flow through the windings such that the total force resulting from the two magnetic forces opposes the vibration direction.

* * * * *